(12) United States Patent
Takemoto

(10) Patent No.: US 8,861,019 B2
(45) Date of Patent: Oct. 14, 2014

(54) IMAGE EVALUATING APPARATUS, IMAGE EVALUATING METHOD, AND NON-TRANSITORY STORAGE MEDIUM FOR READING AND QUANTIFYING AN EVALUATION CHART

(71) Applicant: FUJIFILM Corporation, Tokyo (JP)

(72) Inventor: Fumito Takemoto, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 85 days.

(21) Appl. No.: 13/754,155

(22) Filed: Jan. 30, 2013

(65) Prior Publication Data

US 2013/0201533 A1 Aug. 8, 2013

(30) Foreign Application Priority Data

Feb. 7, 2012 (JP) ................................ 2012-024021

(51) Int. Cl.
*G06K 15/02* (2006.01)
*B41F 33/00* (2006.01)

(52) U.S. Cl.
CPC .......... *G06K 15/027* (2013.01); *B41F 33/0081* (2013.01); *B41F 33/00* (2013.01); *B41F 33/0036* (2013.01)
USPC ............ 358/1.2; 358/406; 358/504; 358/505; 358/474; 358/488

(58) Field of Classification Search
CPC ............................... B41F 33/00; G06K 15/027
USPC ................... 358/406, 504–505, 474, 488, 1.2
See application file for complete search history.

(56) References Cited

U.S. PATENT DOCUMENTS

| | | | | |
|---|---|---|---|---|
| 5,808,312 | A * | 9/1998 | Fukuda | 250/492.2 |
| 6,690,482 | B1 * | 2/2004 | Toyoda et al. | 358/1.2 |
| 6,975,418 | B1 * | 12/2005 | Ohta et al. | 358/1.15 |
| 2003/0127597 | A1 * | 7/2003 | Nakamura et al. | 250/341.1 |
| 2003/0206233 | A1 * | 11/2003 | Lee et al. | 348/240.99 |
| 2004/0239747 | A1 * | 12/2004 | Maeda | 347/116 |

FOREIGN PATENT DOCUMENTS

| | | |
|---|---|---|
| JP | 2000-127353 A | 5/2000 |
| JP | 2002-120357 A | 4/2002 |
| JP | 2006-171471 A | 6/2006 |
| JP | 2009-71779 A | 4/2009 |

* cited by examiner

*Primary Examiner* — Benny Q Tieu
*Assistant Examiner* — Quyen V Ngo
(74) *Attorney, Agent, or Firm* — Birch, Stewart, Kolasch & Birch, LLP

(57) ABSTRACT

Standard positional information is acquired about a plurality of regions of interest to be quantified, which are designated in a standard image region. An image magnification which represents a size ratio of measurement image region represented by the image data to the standard image region is calculated. Positional information of a plurality of regions of interest depending on the measurement image region is calculated based on the acquired standard positional information and the calculated image magnification.

7 Claims, 10 Drawing Sheets

| TOTAL NUMBER OF REGIONS OF INTEREST | BASIC INFORMATION |
|---|---|
| FILE NAME OF IMAGE DATA | |
| IMAGE RESOLUTION | |
| ⋮ | |
| TYPE OF POSITIONING MARK | POSITIONING INFORMATION |
| POSITION OF POSITIONING MARK | |
| ⋮ | |
| POSITIONAL INFORMATION OF FIRST REGION OF INTEREST<br>· POSITION OF ORIGIN<br>· SIZE<br>· ANGULAR DISPLACEMENT | STANDARD POSITIONAL INFORMATION |
| ⋮ | |
| POSITIONAL INFORMATION OF NTH REGION OF INTEREST | |
| ANALYZING CONDITIONS FOR FIRST REGION OF INTEREST<br>· NAME OF ANALYZING MODULE<br>· ARGUMENT (IMAGE RESOLUTION, ETC.) | ANALYZING CONDITION INFORMATION |
| ⋮ | |
| ANALYZING CONDITIONS FOR NTH REGION OF INTEREST | |

IMAGE EVALUATING APPARATUS, IMAGE EVALUATING METHOD, AND NON-TRANSITORY STORAGE MEDIUM FOR READING AND QUANTIFYING AN EVALUATION CHART

CROSS-REFERENCE TO RELATED APPLICATION

This application is based upon and claims the benefit of priority from Japanese Patent Application No. 2012-024021 filed on Feb. 7, 2012, the contents of which are incorporated herein by reference.

BACKGROUND OF THE INVENTION

1. Field of the Invention

The present invention relates to an image evaluating apparatus, an image evaluating method, and a non-transitory storage medium for acquiring image data produced by electronically reading an evaluation chart on a recording medium and quantifying the quality of the evaluation chart based on the acquired image data.

2. Description of the Related Art

Heretofore, there have been proposed various technologies for automatically measuring evaluation charts on recording mediums efficiently and accurately.

Japanese Laid-Open Patent Publication No. 2002-120357 discloses an apparatus for and a method of electronically reading an evaluation chart with positioning marks added thereto, detecting the positions of the positioning marks within an image data region, and calculating the actual position of a chart region to be measured from the relative relationship between the detected positions of the positioning marks and a reference position that has been stored in advance. The publication states that the position of the chart region can be obtained highly accurately.

SUMMARY OF THE INVENTION

If image forming systems with different setups are supplied with identical image data and produce respective evaluation charts based on the supplied image data, then actual image sizes of the evaluation charts may occasionally deviate slightly from a planned size, i.e., an ideal value. Particularly, image sizes tend to change depending on combinations of image processing engines of RIPs (Raster Imaging Processors) and printing presses.

The apparatus and method disclosed in Japanese Laid-Open Patent Publication No. 2002-120357 do not work well in a case where overall image sizes change though they are effective if overall image sizes remain unchanged. In the case where overall image sizes change, measurement locations on the evaluation chart are positionally shifted and accurate measurement results cannot be obtained. Such positional shifts manifest themselves particularly in a case where an evaluation chart made up of a number of test patterns arranged in a complex layout is used.

One solution is to prepare corrective parameters suitable for respective combinations of RIPs and printing presses and store the prepared corrective parameters in a memory in advance. However, the solution is not preferable because the amount of data to be stored in the memory increases in proportion to the total number of combinations of RIPs and printing presses.

It is an object of the present invention to provide an image evaluating apparatus, an image evaluating method, and a non-transitory storage medium which are capable of automatically measuring an evaluation chart efficiently and accurately even if the evaluation chart has an image size deviating from a planned size.

According to an aspect of the present invention, there is provided an image evaluating apparatus for acquiring image data produced by electronically reading an evaluation chart on a recording medium and quantifying quality of the evaluation chart based on the image data, comprising a standard positional information acquirer for acquiring standard positional information about a plurality of regions of interest to be quantified which are designated in a standard image region that is an image region having a standard size in the evaluation chart, an image magnification calculator for calculating an image magnification which represents a size ratio of a measurement image region represented by the image data to the standard image region, and a positional information calculator for calculating positional information of a plurality of regions of interest depending on the measurement image region based on the standard positional information acquired by the standard positional information acquirer and the image magnification calculated by the image magnification calculator.

As described above, the image evaluating apparatus includes the standard positional information acquirer which acquires standard positional information about a plurality of regions of interest to be quantified which are designated in the standard image region, the image magnification calculator which calculates an image magnification which represents the size ratio of a measurement image region to the standard image region, and the positional information calculator which calculates positional information of a plurality of regions of interest depending on the measurement image region based on the acquired standard positional information and the calculated image magnification. Consequently, even if an evaluation chart whose image size deviates from a planned size is generated, the positions of the regions of interest can be designated as planned by taking into account the calculated image magnification. The evaluation chart can thus be automatically measured efficiently and accurately. The image evaluating apparatus is particularly effective if an evaluation chart made up of a number of test patterns arranged in a complex layout is used. Furthermore, since only one type of standard positional information may be acquired for one type of evaluation chart regardless of variations of image size, the storage capacity required for storing positional information may be small to advantage.

Preferably, other image data are acquired by electronically reading the evaluation chart with a first image resolution, the image data comprise image data produced by electronically reading the evaluation chart with a second image resolution which is higher than the first image resolution, and the image magnification calculator calculates the image magnification by multiplying the size ratio of the measurement image region represented by the other image data to the standard image region, by a ratio of the second image resolution to the first image resolution. Therefore, the amount of calculation required to calculate the positional information of each region of interest can be reduced compared with the amount of calculation required if the image data of a relatively high resolution for actual measurement and evaluation are used.

The evaluation chart should preferably have at least one positioning mark, and the image magnification calculator should preferably calculate the image magnification based on a position of the positioning mark which is present in the measurement image region.

The evaluation chart should preferably have, as the at least one positioning mark, a reference mark representing a reference position and a first mark and a second mark representing respective positions which are different from the reference position. The reference mark should preferably be located at a point where a line segment interconnecting the reference mark and the first mark and a line segment interconnecting the reference mark and the second mark join each other perpendicularly.

The image evaluating apparatus should preferably further comprise a particular mark detector for detecting the position of the positioning mark in the measurement image region.

According to another aspect of the present invention, there is provided an image evaluating method for acquiring image data produced by electronically reading an evaluation chart on a recording medium and quantifying quality of the evaluation chart based on the image data, the image evaluating method enabling a computer to carry out the steps of acquiring standard positional information about a plurality of regions of interest to be quantified which are designated in a standard image region that is an image region having a standard size in the evaluation chart, calculating an image magnification which represents a size ratio of a measurement image region represented by the image data to the standard image region, and calculating positional information of a plurality of regions of interest depending on the measurement image region based on the acquired standard positional information and the calculated image magnification.

According to still another aspect of the present invention, there is provided a non-transitory storage medium storing a program for acquiring image data produced by electronically reading an evaluation chart on a recording medium and quantifying quality of the evaluation chart based on the image data, the program enabling a computer to carry out the steps of acquiring standard positional information about a plurality of regions of interest to be quantified which are designated in a standard image region that is an image region having a standard size in the evaluation chart, calculating an image magnification which represents a size ratio of a measurement image region represented by the image data to the standard image region, and calculating positional information of a plurality of regions of interest depending on the measurement image region based on the acquired standard positional information and the calculated image magnification.

With the image evaluating apparatus, the image evaluating method, and the non-transitory storage medium according to the present invention, standard positional information is acquired about a plurality of regions of interest to be quantified which are designated in a standard image region, an image magnification which represents the size ratio of a measurement image region represented by the image data to the standard image region is calculated, and positional information of a plurality of regions of interest depending on the measurement image region is calculated based on the acquired standard positional information and the calculated image magnification. Consequently, even if an evaluation chart whose image size deviates from a planned size is generated, the positions of the regions of interest can be designated as planned by taking into account the calculated image magnification. The evaluation chart can thus be automatically measured efficiently and accurately. The image evaluating apparatus, the image evaluating method, and the non-transitory storage medium are particularly effective if an evaluation chart made up of a number of test patterns arranged in a complex layout is used. Furthermore, since only one type of standard positional information may be acquired for one type of evaluation chart regardless of variations of image size, the storage capacity required for storing positional information may be small to advantage.

The above and other objects, features, and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 7 is a diagram showing a data structure of a measuring condition file;

DESCRIPTION OF THE PREFERRED EMBODIMENTS

An image evaluating method according to a preferred embodiment of the present invention in relation to an image evaluating apparatus and an image evaluating system which carry out the image evaluating method will be described in detail below with reference to the accompanying drawings. Hereinafter, forming an image will also be referred to as "printing".

Figure 1:
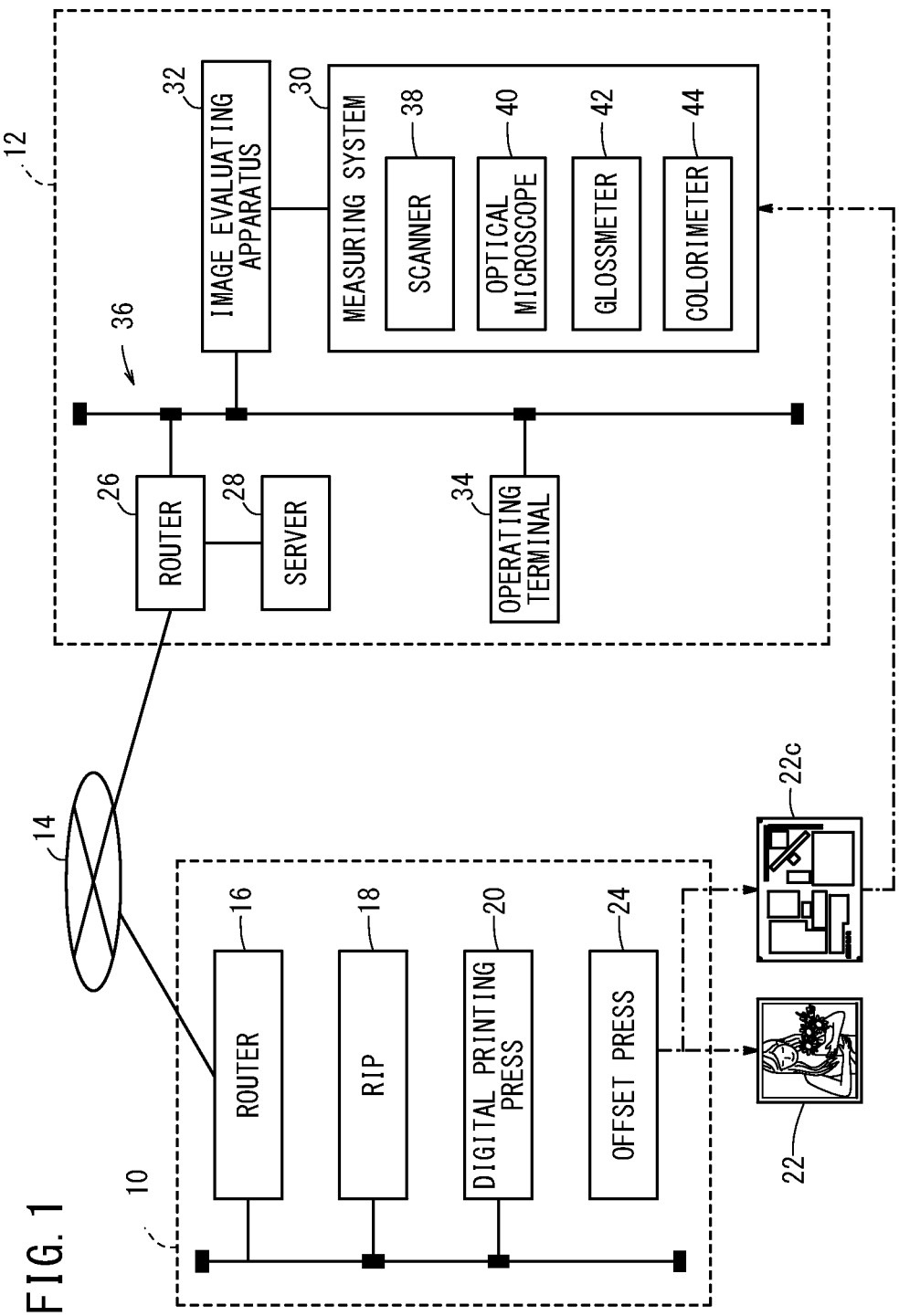
FIG. 1 is a block diagram of an image evaluating system incorporating therein an image evaluating apparatus according to an embodiment of the present invention.

FIG. 1 shows in block form an image evaluating system 12 incorporating therein an image evaluating apparatus 32 according to an embodiment of the present invention. As shown in FIG. 1, the image evaluating system 12 is connected to a print production system 10 by a network 14.

The print production system 10 includes a router 16 as a device for connection to the network 14, a RIP 18 for performing various image processing processes including a rasterizing process, a color converting process, etc. on proof data or platemaking data, a digital printing press 20 for producing prints based on platemaking data sent from the RIP 18, and an offset press 24 for producing a print 22 which includes an evaluation chart 22c with printing plates, not shown, mounted thereon.

The digital printing press 20 is an apparatus for directly forming an image on a print medium, i.e., a recording medium, to produce the print 22, without using printing plates, not shown. The digital printing press 20 may be in the form of an ink jet color proofer, a color laser printer (electrophotographic printer), or the like. The offset press 24 produces the print 22 by applying inks to a print medium through printing plates and intermediate ink transfer members, not shown.

The image evaluating system 12 serves to quantify the quality (image quality and image appearance) of the evaluation chart 22c produced by the print production system 10.

The image evaluating system 12 includes a router 26 as a device for connection to the network 14, a server 28 accessible from various terminal devices belonging to an internal network and an external network, a measuring system 30 for measuring the evaluation chart 22c, the image evaluating apparatus 32 for quantifying the quality of the evaluation chart 22c based on image data Id (see FIG. 2) which are generated by electronically reading the evaluation chart 22c, and an operating terminal 34 for browsing the quantified quality of the evaluation chart 22c which is generated by the image evaluating apparatus 32.

The server 28 is a device for managing all of various data about the measurement and evaluation of the evaluation chart 22c. The server 28 is connected to the image evaluating apparatus 32 and the operating terminal 34 for communication therewith through a LAN (Local Area Network) 36 constructed in the image evaluating system 12. The server 28 is also connected to a working terminal, i.e., the RIP 18 in FIG. 1, in the print production system 10 through the router 26 and the network 14.

The measuring system 30 optically reads the evaluation chart 22c to acquire optical information, e.g., two-dimensional image data Id, of the evaluation chart 22c. The measuring system 30 includes a scanner 38, an optical microscope 40, a glossmeter 42, and a colorimeter 44. The measuring system 30 is not limited to the illustrated type and setup, but may comprise various other components. For example, the scanner 38 may be a flatbed scanner for reading reflective documents or a film scanner for reading transmissive documents.

Figure 2:
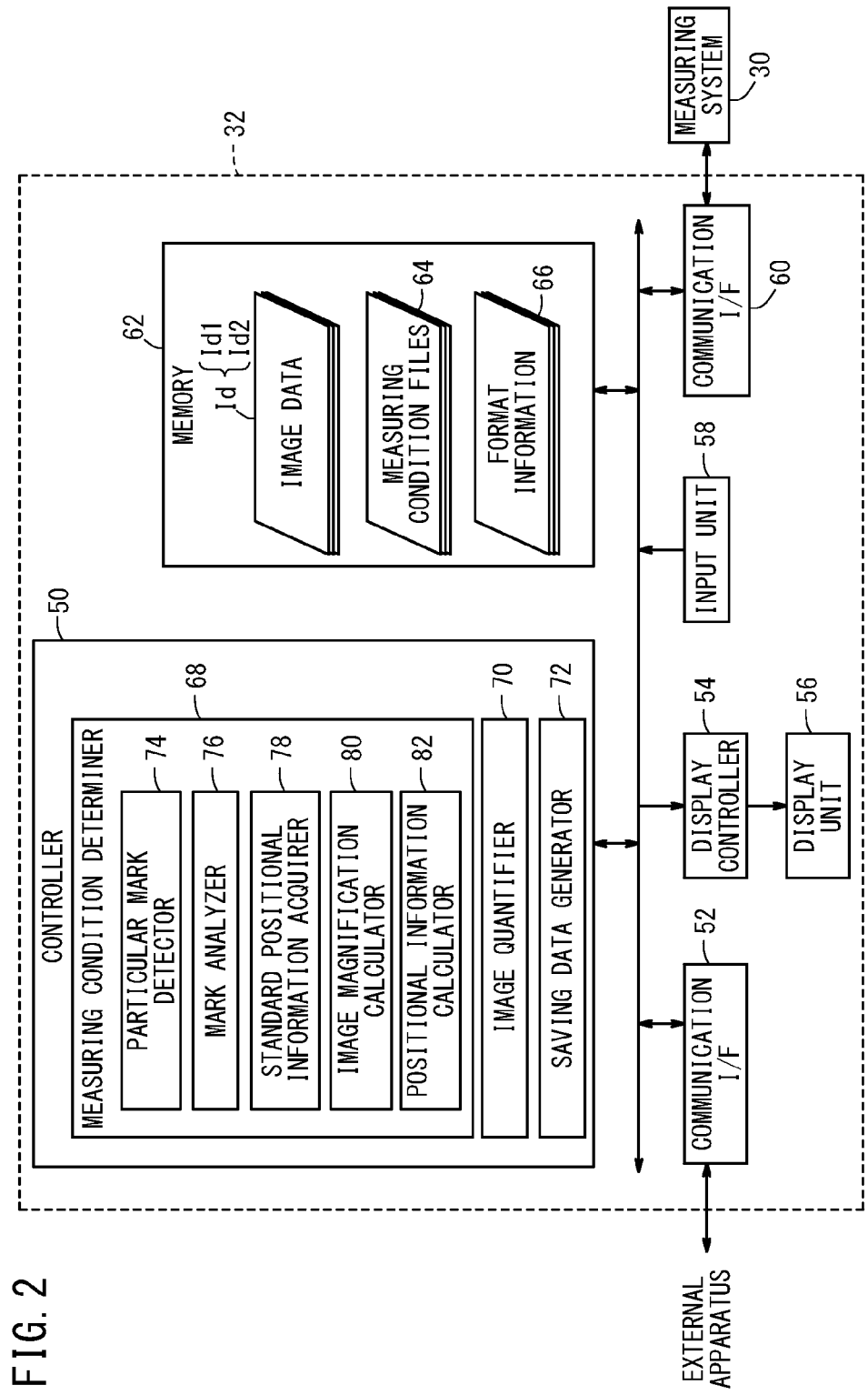
FIG. 2 is an electric block diagram of the image evaluating apparatus shown in FIG. 1.

FIG. 2 is an electronic block diagram of the image evaluating apparatus 32 shown in FIG. 1.

As shown in FIG. 2, the image evaluating apparatus 32 comprises a computer having a controller 50, a communication I/F 52, a display controller 54, a display unit 56, an input unit 58, a communication I/F 60, and a memory 62 (non-transitory storage medium).

The communication I/F 52 is an interface for sending and receiving electric signals to and from external apparatus. For example, the image evaluating apparatus 32 can send and receive various data files to and from the server 28 (see FIG. 1), for example, through the communication I/F 52.

The display controller 54 is a control circuit that is controlled by the controller 50 to energize the display unit 56. In a case where the display controller 54 outputs a display control signal to the display unit 56 through an I/F, not shown, the display unit 56 is energized to display various images.

The input unit 58 comprises various input devices including a mouse, a trackball, a keyboard, etc. for entering various signals from the user of the image evaluating apparatus 32. The display function of the display unit 56 and the input function of the input unit 58 are combined into a user interface.

The communication I/F 60 is an interface for sending and receiving various data about measurement to and from various measuring devices in the measuring system 30. Actually, the communication I/F 60 comprises a plurality of communication I/Fs through which the image evaluating apparatus 32 is electrically connected to the measuring devices in the measuring system 30. For illustrative purpose, those communication I/Fs are shown as one I/F, i.e., the communication I/F 60.

The memory 62 stores programs and data which are required by the controller 50 to control various components of the image evaluating apparatus 32. In FIG. 2, the data stored in the memory 62 include image data Id (including image data Id1, Id2 to be described later) representative of the evaluation chart 22c, measuring condition files 64, and format information 66. The memory 62 may be a non-transitory, computer-readable storage medium such as a nonvolatile memory, a hard disk, or the like.

The controller 50 comprises a processor such as a CPU (Central Processing Unit) or the like. The controller 50 reads the programs stored in the memory 62 to carry out various functions that include a measuring condition determiner 68, an image quantifier 70, and a saving data generator 72.

The measuring condition determiner 68 determines measuring conditions depending on the type of the evaluation chart 22c and the acquired state of the image data Id. Specifically, the measuring condition determiner 68 includes a particular mark detector 74 for detecting marks of particular shapes (hereinafter referred to as "particular marks") from an image region represented by the image data Id, a mark analyzer 76 for analyzing detected particular marks such as a bar code 104, a positioning mark 106, etc. shown in FIG. 4, a standard positional information acquirer 78 for acquiring standard positional information which serves as positional information about a plurality of regions 116 of interest (see FIG. 10A) in a standard image region Rs that is an image region having a standard size, an image magnification calculator 80 for calculating image magnifications ($\eta x, \eta y$) which represent the size ratios of a measurement image region Rm1, etc. (an image region to be measured) to a standard image region Rs, and a positional information calculator 82 for calculating positional information of a plurality of regions 120 of interest (see FIG. 10B) depending on the measurement image region Rm1, etc. based on the image magnifications ($\eta x, \eta y$) and the standard positional information.

The image quantifier 70 captures the regions 120 of interest from the image data Id, and quantifies the regions 120 of interest with respect to each of pre-designated evaluation items, thereby producing evaluation values. The evaluation items may be, for example, noise/granularity, NPS (Noise Power Spectrum), in-plane color uniformity, CTF (Contrast Transfer Function), MTF (Modulation Transfer Function), acutance, gradation, color reproducibility, banding, striped irregularity, raggedness, and image distortion.

The saving data generator 72 arranges the evaluation values produced by the quantification with the image quantifier 70 according to a given data format, thereby generating a saving data file (hereinafter referred to as "measurement result file"). The data format may be a uniquely defined format or a format that can be directly browsed using general-purpose spreadsheet software.

The image evaluating apparatus 32 is basically constructed as described above. Operation of the image evaluating apparatus 32 will be described below with reference to a flowchart in FIG. 3.

Figure 3:
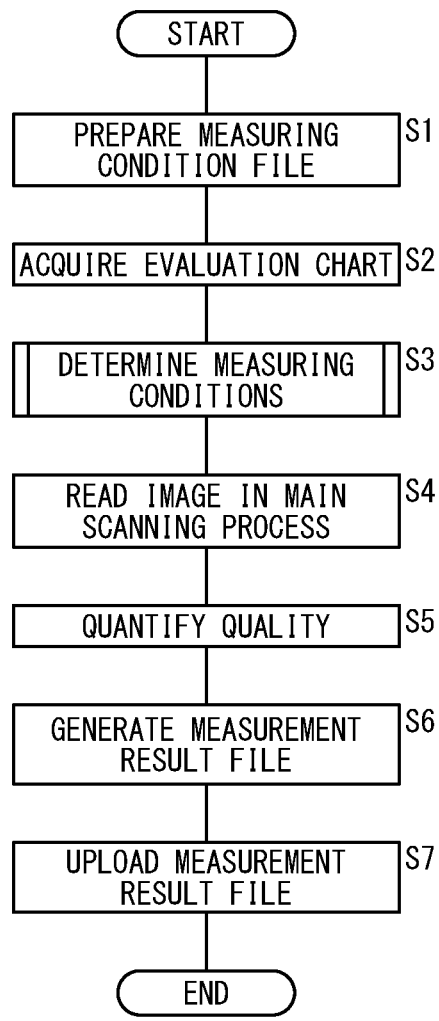
FIG. 3 is a flowchart of an operation sequence of the image evaluating apparatus shown in FIGS. 1 and 2.

In step S1 shown in FIG. 3, the image evaluating apparatus 32 prepares at least one measuring condition file 64 in order to quantify the quality of the evaluation chart 22c. For example, the controller 50 downloads a measuring condition file 64 from the server 28 and temporarily stores the downloaded measuring condition file 64 in the memory 62. If there are a plurality of types of evaluation charts 22c, then the image evaluating apparatus 32 should preferably prepare a measuring condition file 64 that is suitable for the image of an evaluation chart 22*c* to be used. The data structure of the measuring condition file 64 will be described later with reference to FIG. 7.

In step S2, an image evaluator as the user acquires an evaluation chart 22*c*, which is a target object whose quality is to be quantified. In FIG. 1, the printer uses the offset press 24 in the print production system 10 to print an evaluation chart 22*c*, and then sends the printed evaluation chart 22*c* to a site where the image evaluating system 12 is installed.

Figure 4:
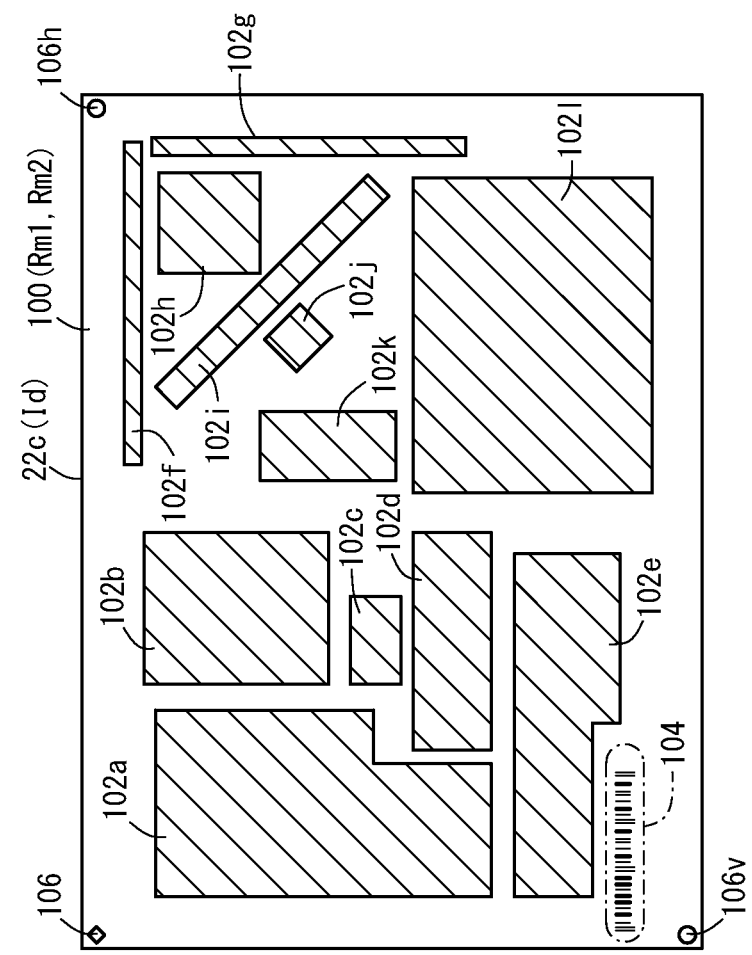
FIG. 4 is a front elevational view of an evaluation chart shown in FIG. 1.
Figure 5:
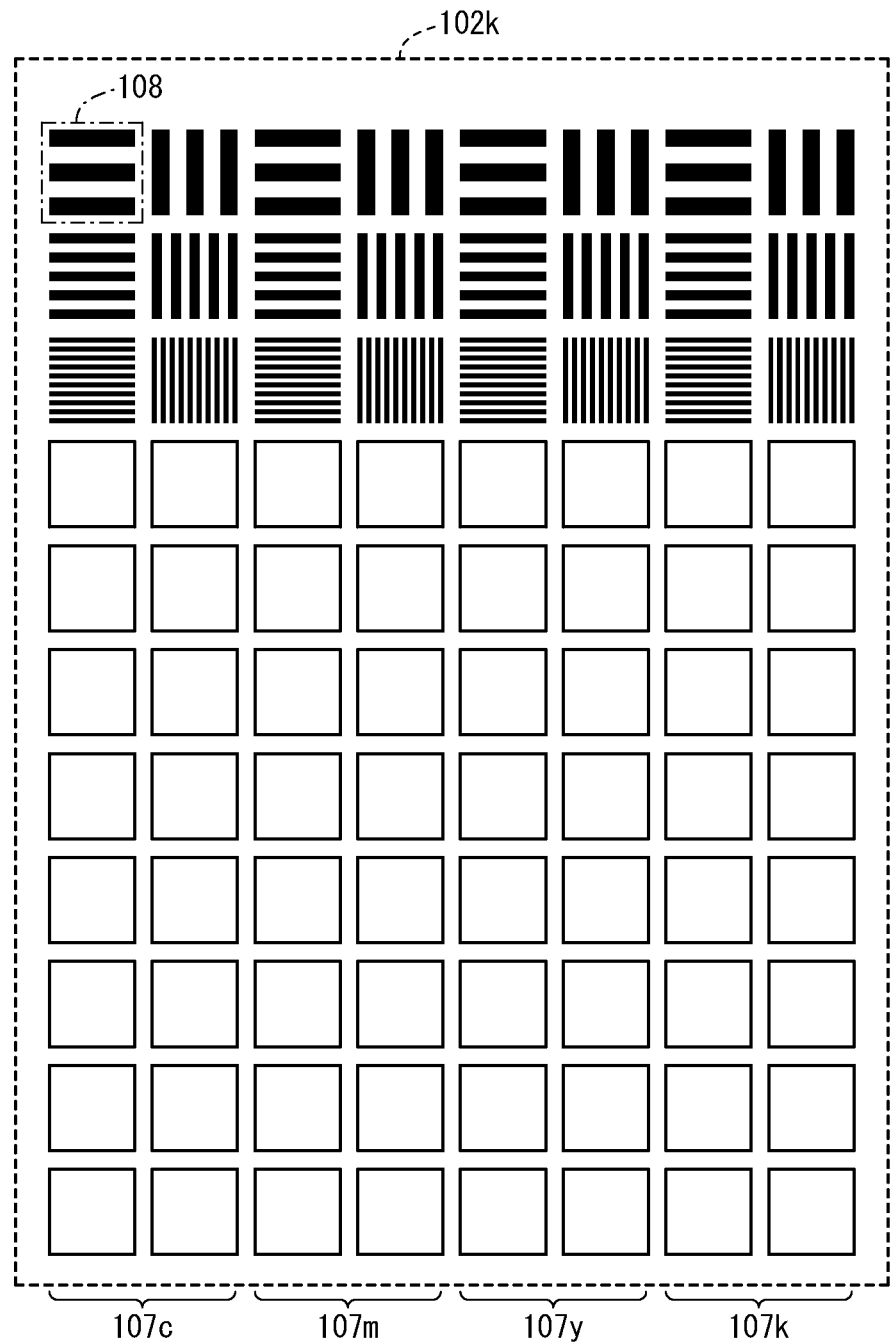
FIG. 5 is an enlarged view of a portion of the evaluation chart shown in FIG. 4.

FIG. 4 is a front elevational view of the evaluation chart 22*c* shown in FIG. 1, and FIG. 5 is an enlarged view of a portion of the evaluation chart 22*c* shown in FIG. 4.

As shown in FIG. 4, the evaluation chart 22*c* includes twelve test patterns 102*a* through 102*l* on a rectangular sheet 100 as a recording medium. Each of the test patterns 102*a* through 102*l*, shown hatched for simplification of illustration, is a pattern which is suitable for quality quantification. For example, a test pattern for evaluating color reproducibility is made up of a plurality of color patches of different colors, and a test pattern for evaluating the smoothness of a gradation curve is made up of a gradation image. A specific example of the image of a test pattern will be described below.

As shown in FIG. 5, the test pattern 102*k* has monochromatic CTF charts 107*c*, 107*m*, 107*y*, 107*k* for evaluating the sharpness of an image. The CTF chart 107*c*, which is printed in a single color of C (Cyan), has a total of 22 sub-patterns 108 each comprising a set of thin lines (vertical or horizontal lines). The CTF charts 107*m*, 107*y*, 107*k*, which are printed in respective single colors of M (Magenta), Y (Yellow), and K (black), are of the same setup as the CTF chart 107*c*.

The sub-patterns 108 are spaced at substantially equal intervals along the vertical directions of the CTF chart 107*c*. For illustrative purposes, those sub-patterns 108 down to the third one from above in each row are illustrated in detail, and the remaining sub-patterns 108 are illustrated in contour only. As can be seen from FIG. 5, the width of the thin lines in the sub-patterns 108 is progressively smaller along the downward direction of the CTF chart 107*c*. In other words, the spatial frequency (unit: cycle/mm) to be evaluated is progressively higher along the downward direction of the CTF chart 107*c*.

As shown in FIG. 4, as well as the test patterns 102*a* through 102*l*, the sheet 100 is also printed with a bar code 104 that extends horizontally, and three positioning marks including a reference mark 106 and first and second marks 106*h*, 106*v*. The bar code 104, which is present on a lower left area of the sheet 100, is a code mark representative of encoded management information which represents the type of the evaluation chart 22*c*, image forming conditions therefor, etc. The three positioning marks 106, 106*h*, 106*v*, which are present at respective three corners of the sheet 100, are marks for detecting the position and posture of the evaluation chart 22*c* in the image region represented by the image data Id. The positioning mark 106 is located at a point where a line segment interconnecting the positioning marks 106, 106*h* and a line segment interconnecting the positioning marks 106, 106*v* join each other perpendicularly.

In a case where the image data Id are made visual, a visible image which is substantially shaped as shown in FIGS. 4 and 5 is produced in image regions to be measured (hereinafter referred to as "measurement image regions Rm1, Rm2"). For an easier understanding of the present invention, an image object on the evaluation chart 22*c* and an image object on the image data Id will occasionally be described interchangeably, and an image region represented by the sheet 100 and the measurement image regions Rm1, Rm2 will also occasionally be described interchangeably.

In step S3, the measuring condition determiner 68 determines measuring conditions depending on the type of the evaluation chart 22*c* and the acquired state of the image data Id. Specific operation of the measuring condition determiner 68 in step S3 will be described in detail with reference to a flowchart shown in FIG. 6. In the present embodiment, a measuring and evaluating process using the scanner 38 will be described below. However, a measuring and evaluating process may be carried out using another measuring device, e.g., the optical microscope 40.

Figure 6:
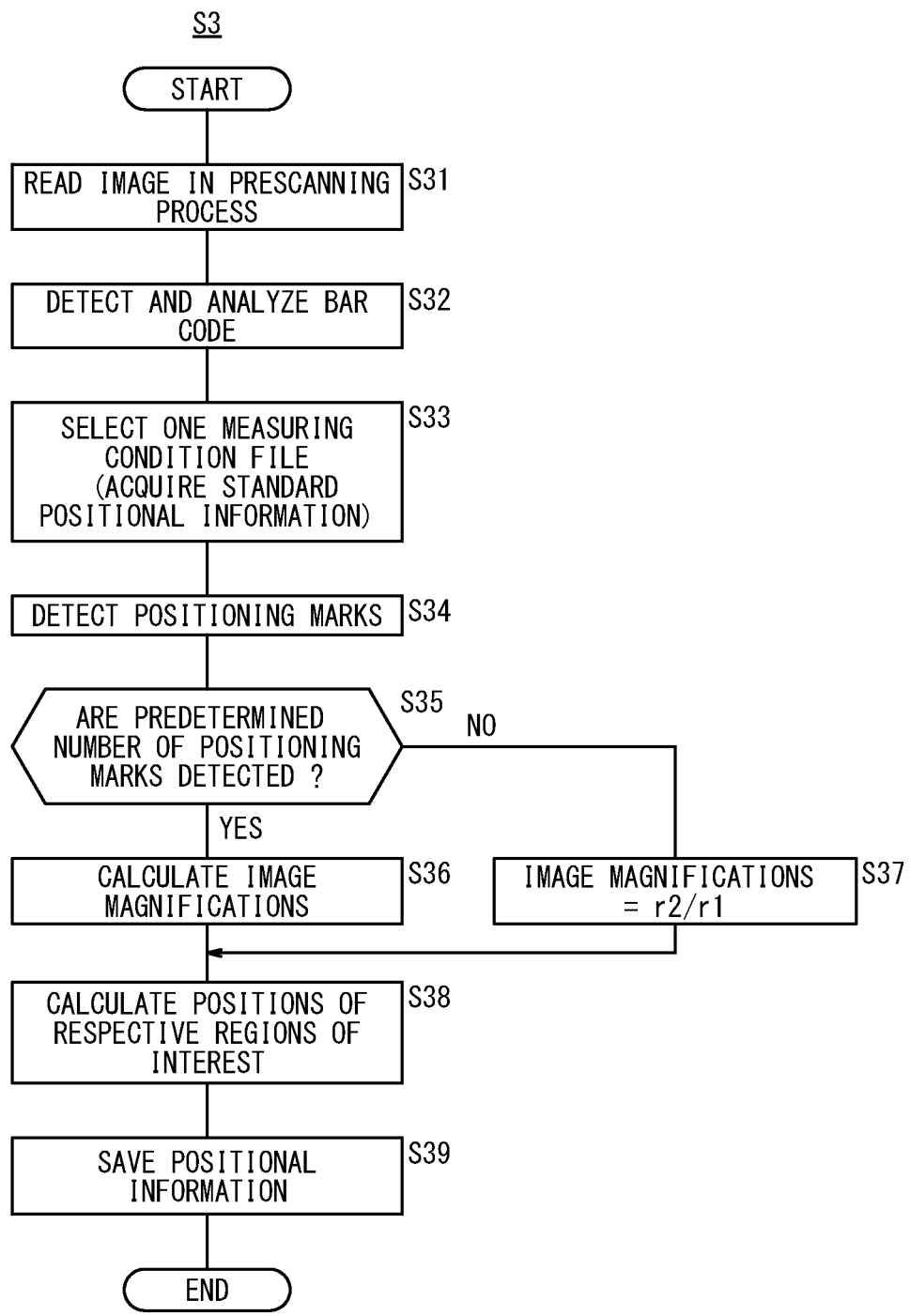
FIG. 6 is a detailed flowchart of a process of determining measuring conditions in step S3 of the flowchart shown in FIG. 3.

In step S31 shown in FIG. 6, the image of the evaluation chart 22*c* is read in a prescanning process to generate image data Id1 (other image data) that has an image resolution r1 [dpi (dot per inch)]. The prescanning process refers to a mode for reading the image of the evaluation chart 22*c* with a relatively low resolution. A main scanning process, to be described later, refers to a mode for reading the image of the evaluation chart 22*c* with a relatively high resolution r2 [dpi] (second image resolution: r2>r1) to produce image data Id2.

In step S32, the particular mark detector 74 detects and analyzes the bar code 104 in the measurement image region Rm1 represented by the image data Id1. Specifically, the measuring condition determiner 68 judges whether the bar code 104 is present in the measurement image region Rm1 or not. The mark analyzer 76 acquires code information from the image area of the detected bar code 104, and decodes the acquired code information according to known bar code standards. It is assumed that the mark analyzer 76 has obtained the type (e.g., an identification number) of the evaluation chart 22*c*.

In step S33, the measuring condition determiner 68 selects and reads one of the measuring condition files 64 stored in the memory 62 depending on the identification number of the evaluation chart 22*c* obtained in step S32.

As shown in FIG. 7, each of the measuring condition files 64 has a data structure including basic information common to various measuring and evaluating events, positioning information which serves as information about the positioning mark 106, 106*h*, 106*v*, standard positional information about regions 116 of interest in the standard image region Rs (image resolution r0 [dpi]), and analyzing condition information which serves as information about analyzing conditions for regions 116 of interest. Each of the measuring condition files 64 is not limited to the data structure shown in FIG. 7, but may be of any other data structures.

The term "standard image region" referred to herein means a hypothetical image region having a given size and image resolution defined in the measuring condition files 64. Insofar as the image resolution r0 is known, it may be of any desired value because the actual position of each region 116 of interest, i.e., the position thereof on the evaluation chart 22*c*, can uniquely be specified from its relationship to the standard positional information. As described later, common standard positional information may be used regardless of the image resolutions (r1, r2) for reading the evaluation chart 22*c*.

The basic information may include the total number of regions 116 of interest (N regions 116 of interest), the file name of the image data Id, the image resolutions (r1, r2), etc. The positional information may include the types, positions, etc. of the positioning marks 106, 106*h*, 106*v*, e.g., the positions thereof in the standard image region Rs as converted into the numbers of pixels. The standard positional information includes the positions of origins, sizes, angular displacements, etc. of the respective regions 116 of interest. The analyzing condition information includes the names of analyzing modules (evaluation items) for the respective regions 116 of interest, the arguments (e.g., the image resolution r2) for the respective analyzing modules, etc.

Figure 8:
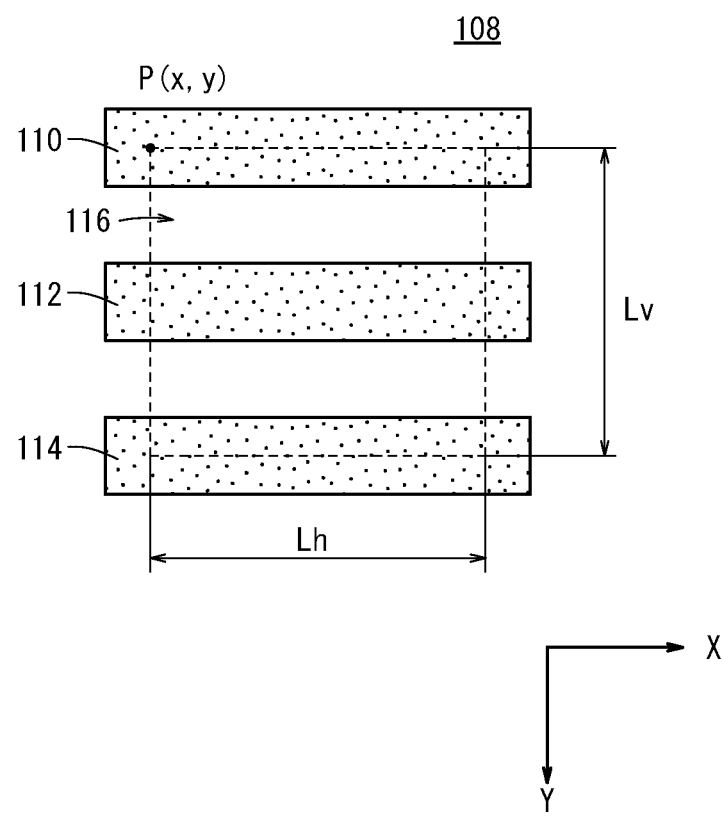
FIG. 8 is an enlarged view of a sub-pattern shown in FIG. 5.

FIG. 8 is an enlarged view of one of the sub-patterns 108 shown in FIG. 5. The sub-pattern 108 shown in FIG. 8 comprises three thin lines 110, 112, 114 extending along an X-axis direction. The rectangular region 116 of interest lies across the three thin lines 110, 112, 114. According to the data structure shown in FIG. 7, the positional information for the region 116 of interest includes an origin position P (x,y), a size (Lv, Lh), and an angular displacement 0 [degrees].

In step S34, the particular mark detector 74 detects the positioning marks 106, 106h, 106v in the measurement image region Rm1. Specifically, the particular mark detector 74 detects the positioning mark 106, which is of a lozenge shape, disposed in an upper left corner of the measurement image region Rm1, the positioning mark 106h, which is of a circular shape, disposed in an upper right corner of the measurement image region R1, and the positioning mark 106v, which is of a circular shape, disposed in a lower left corner of the measurement image region R1, while referring to the positioning information (see FIG. 7). The number of positioning marks is not limited to three, but at least one positioning mark may be present on the evaluation chart 22c. For example, an L-shaped mark may be printed in a corner of the evaluation chart 22c or a rectangular frame may be printed along peripheral edges of the evaluation chart 22c for performing a positioning function to be described later.

In step S35, the particular mark detector 74 judges whether it has detected a number of (three in FIG. 4) positioning marks 106 that are designated by the positioning information (see FIG. 7) or not. If the particular mark detector 74 decides that it has detected all the positioning marks 106, then control goes to next step S36.

In step S36, the image magnification calculator 80 calculates image magnifications (ηx, ηy) which represent the size ratios of the measurement image regions Rm1, Rm2 to the standard image region Rs. A specific process of calculating image magnifications (ηx, ηy) will be described below with reference to FIGS. 9A and 9B.

Figure 9A:
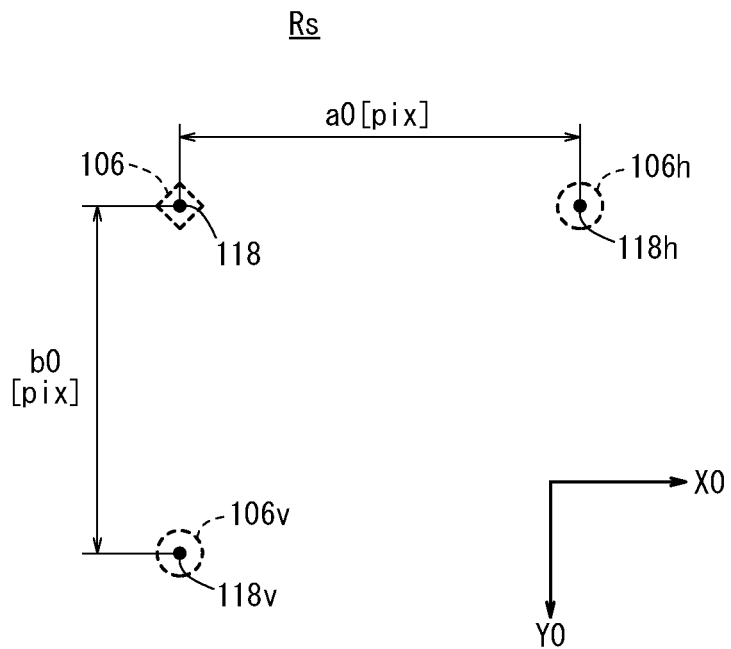
FIGS. 9A and 9B are diagrams schematically showing a process of calculating image magnifications.

As shown in FIG. 9A, the standard image region Rs represents the X0-Y0 coordinate space (hereinafter also referred to as "standard coordinate space") of a two-dimensional matrix of pixels. The positioning marks 106, 106h, 106v, which are shown by the broken lines in FIG. 9A, have their positions, i.e., a reference position 118, a first position 118h, and a second position 118v, respectively, designated in advance in the standard coordinate space. It is assumed that the reference position 118 and the first position 118h are spaced from each other by a distance a0 [pix] and the reference position 118 and the second position 118v are spaced from each other by a distance b0 [pix].

Figure 9B:
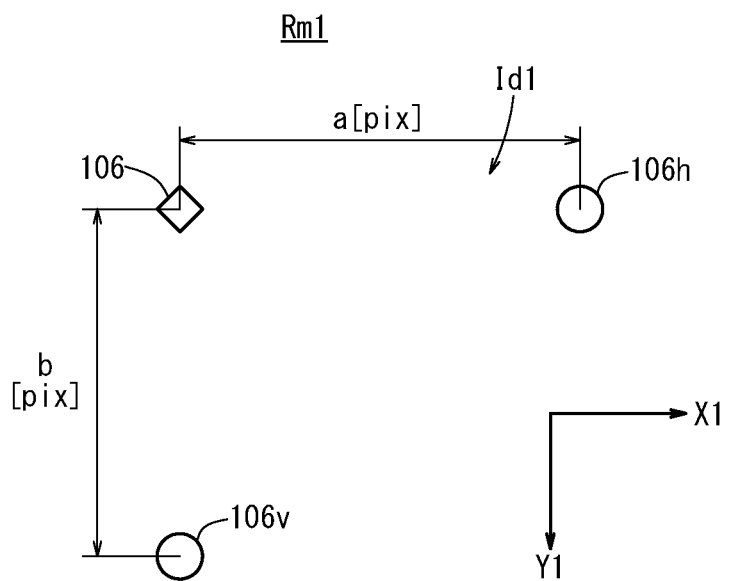

As shown in FIG. 9B, the measurement image region Rm1 represents the X1-Y1 coordinate space (hereinafter also referred to as "first coordinate space") of a plurality of pixels of the image data Id1. The image magnification calculator 80 calculates the distance between a central pixel of the positioning mark 106 and a central pixel of the positioning mark 106h in the first coordinate space, i.e., a distance a [pix] in terms of a number of pixels. Similarly, the image magnification calculator 80 calculates the distance between the central pixel of the positioning mark 106 and a central pixel of the positioning mark 106v in the first coordinate space, i.e., a distance b [pix] in terms of a number of pixels. An image magnification ηx along an X-axis direction and an image magnification ηy along a Y-axis direction are expressed according to the following equations (1), (2), respectively:

$$\eta x = a/a0 \quad (1)$$

$$\eta y = b/b0 \quad (2)$$

In the present embodiment, the image resolution r1 of the image data Id1 for determining the positions of the regions 120 of interest (see FIG. 10B) is different from the image resolution r2 of the image data Id2 for measuring and evaluating the evaluation chart 22c. In other words, the calculated positional information cannot be used for subsequent measurements. Therefore, the image magnification calculator 80 calculates image magnifications by multiplying the right sides of the equations (1), (2) by the ratio of the image resolutions (=r2/r1). The image magnifications ηx, ηy are thus expressed according to the following equations (3), (4), respectively:

$$\eta x = (a/a0) \cdot (r2/r1) \quad (3)$$

$$\eta y = (b/b0) \cdot (r2/r1) \quad (4)$$

If the particular mark detector 74 decides that it has not detected the designated number of positioning marks 106, then the image magnification calculator 80 determines the image magnifications (ηx, ηy) as ηx=ηy=(r2/r1) (step S37). If the image magnifications in the prescanning process and the main scanning process are the same as each other, then ηx=ηy=1.

In step S38, the positional information calculator 82 calculates respective positional information of the regions 120, 122 of interest in the measurement image regions Rm1, Rm2 based on the image magnifications (ηx, ηy) calculated in steps S36, S37 and the standard positional information, acquired in step S33, of the respective regions 116 of interest in the standard image region Rs. A specific process of calculating the positional information will be described below with reference to FIGS. 10A through 10C.

Figure 10A:
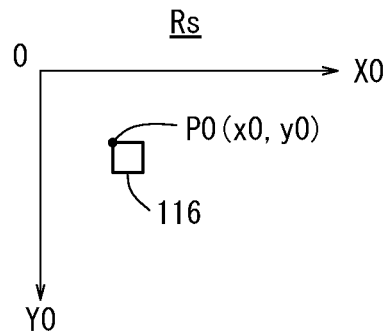
FIGS. 10A through 10C are diagrams schematically showing a process of calculating positional information about a region of interest.
Figure 10B:
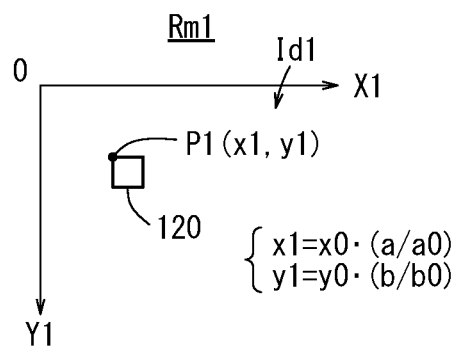

It is assumed that the position of the origin of one region 116 of interest in the standard image region Rs (in the standard coordinate space) shown in FIG. 10A is represented by P0 (x0, y0), and that the position of the origin, which corresponds to the position P0 (x0, y0) of the origin, in the measurement image region Rm1 (in first coordinate space) shown in FIG. 10B is represented by P1 (x1, y1). The coordinates x1, y1 of the position P1 are expressed according to the following equations (5), (6), respectively:

$$x1 = x0 \cdot \eta x = x0 \cdot (a/a0) \quad (5)$$

$$y1 = y0 \cdot \eta y = y0 \cdot (b/b0) \quad (6)$$

Consequently, even if the image size of the evaluation chart 22c deviates from a planned size depending on the combination of the image processing engine of the RIP 18 and the printing press, the position of each region 120 of interest can be designated as planned in the measurement image region Rm1.

Figure 10C:
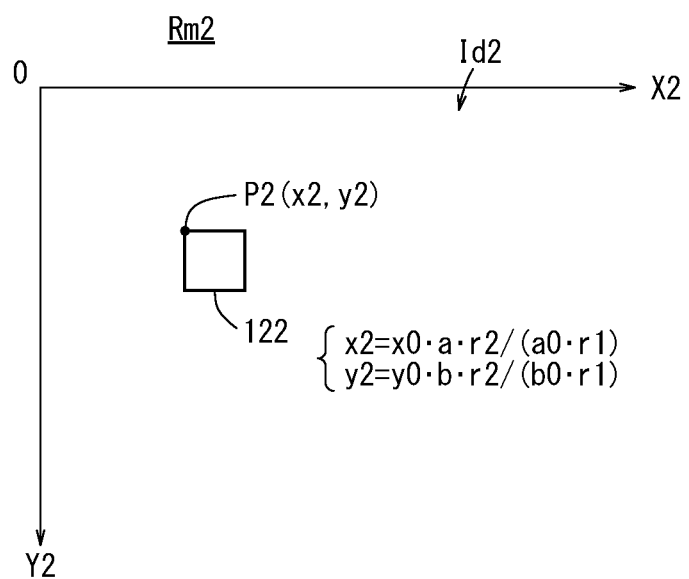

The measurement image region Rm2 shown in FIG. 10C represents the X2-Y2 coordinate space (hereinafter also referred to as "second coordinate space") of a plurality of pixels of the image data Id2. It is assumed that the position of the origin, which corresponds to the position P0 (x0, y0) of the origin, in the measurement image region Rm2 (in second coordinate space) is represented by P2 (x2, y2). The coordinates x2, y2 of the position P2 are expressed according to the following equations (7), (8), respectively:

$$x2 = x1 \cdot (r2/r1) = x0 \cdot a \cdot r2/(a0 \cdot r1) \quad (7)$$

$$y2 = y1 \cdot (r2/r1) = y0 \cdot b \cdot r2/(b0 \cdot r1) \quad (8)$$

Even though the image data Id1 that is of a relatively low resolution are used instead of the image data Id2 that is of a relatively high resolution, therefore, the position of each region 122 of interest can be designated as planned in the measurement image region Rm2. Furthermore, the amount of calculation required to calculate the positional information of each region 122 of interest can be reduced compared with the amount of calculation required if the image data Id2 of a relatively high resolution for actual measurement and evaluation are used. In particular, it is preferable to satisfy the relationship: r0<r1<r2 in order to achieve both desired processing time and processing accuracy for positional calculation. The relationship: r0=r1 is more preferable because it allows the dimensional accuracy (=a/a0, b/b0) of the image of the evaluation chart 22c to be measured directly.

In step S39, the controller 50 temporarily stores the positional information calculated in step S38 in the memory 62.

As described above, the measuring condition determiner 68 determines measuring conditions depending on the type, etc. of the evaluation chart 22c. The positional information calculated in step S38 may be erased from the memory 62 after it has been referred to in quantifying the quality based on the image data Id2 (see step S5 in FIG. 3). As only one type of standard positional information may be prepared for one type of evaluation chart 22c, the storage capacity required for storing positional information may be small to advantage.

In step S4 of FIG. 3, the scanner 38 reads the image of the evaluation chart 22c in the main scanning process to acquire image data Id2 that has an image resolution r2 [dpi]. In order to increase the accuracy of the positional information, it is preferable to acquire the image data Id1, Id2 in substantially the same measuring environments. For example, it is preferable to successively acquire the image data Id1, Id2 by reading twice the image of the evaluation chart 22c that has been set in a given position in the scanner 38.

In step S5, the image quantifier 70 analyzes the image data Id2 acquired in step S4 according to the measuring conditions acquired in step S4. Now, a result (evaluation values for the respective evaluation items) representative of the quantified quality of the evaluation chart 22c can be obtained.

In step S6, the saving data generator 72 generates a measurement result file according to a given data format based on the measured values obtained in step S5. The given data format is represented by one of a plurality of items of format information 66 stored in the memory 62 which is selected depending on the type of the evaluation chart 22c obtained in step S32 (see FIG. 6), for example.

In step S7, the measurement result generated in step S6 is uploaded to the server 28. Thus, the operator can browse the measurement results of the evaluation chart 22c using the operating terminal 34 in the image evaluating system 12. Measurement results of evaluation charts 22c may be browsed through operating terminals of an external network, e.g., the RIP 18 in the print production system 10.

As described above, the image evaluating apparatus 32 includes the standard positional information acquirer 78 which acquires standard positional information about a plurality of regions 116 of interest to be quantified which are designated in the standard image region Rs, the image magnification calculator 80 which calculates image magnifications ($\eta x$, $\eta y$) which represent the size ratios of measurement image regions Rm1, Rm2 to the standard image region Rs, and the positional information calculator 82 which calculates positional information of a plurality of regions 120, 122 of interest depending on the measurement image regions Rm1, Rm2 based on the acquired standard positional information and the calculated image magnifications ($\eta x$, $\eta y$). Consequently, even if an evaluation chart 22c whose image size deviates from a planned size is generated, the positions of the regions 120, 122 of interest can be designated as planned by taking into account the calculated image magnifications ($\eta x$, $\eta y$). The evaluation chart 22c can thus be automatically measured efficiently and accurately. The image evaluating apparatus 32 is particularly effective if an evaluation chart 22c made up of a number of test patterns arranged in a complex layout is used. Furthermore, since only one type of standard positional information may be acquired for one type of evaluation chart 22c regardless of variations of image size, the storage capacity required for storing positional information may be small to advantage.

Although a preferred embodiment of the present invention has been described above, it will be understood that various changes and modifications can be made therein without departing from the scope of the appended claims.

What is claimed is:

1. An image evaluating apparatus for acquiring image data produced by electronically reading an evaluation chart on a recording medium and quantifying quality of the evaluation chart based on the image data, comprising:
   a standard positional information acquirer for acquiring standard positional information about a plurality of regions of interest to be quantified which are designated in a standard image region that is an image region having a standard size in the evaluation chart, the standard positional information being acquired by reading a data file depending on the evaluation chart;
   an image magnification calculator for calculating an image magnification which represents a size ratio of a measurement image region represented by the image data to the standard image region; and
   a positional information calculator for calculating positional information of the plurality of regions of interest depending on the measurement image region based on the standard positional information acquired by the standard positional information acquirer and the image magnification calculated by the image magnification calculator.

2. The image evaluating apparatus according to claim 1, wherein other image data are acquired by electronically reading the evaluation chart with a first image resolution;
   the image data comprise image data produced by electronically reading the evaluation chart with a second image resolution which is higher than the first image resolution; and
   the image magnification calculator calculates the image magnification by multiplying the size ratio of the measurement image region represented by the other image data to the standard image region, by a ratio of the second image resolution to the first image resolution.

3. The image evaluating apparatus according to claim 1, wherein the evaluation chart has at least one positioning mark; and
   the image magnification calculator calculates the image magnification based on a position of the positioning mark which is present in the measurement image region.

4. The image evaluating apparatus according to claim 3, wherein the evaluation chart has, as the at least one positioning mark, a reference mark representing a reference position and a first mark and a second mark representing respective positions which are different from the reference position; and
   the reference mark is located at a point where a line segment interconnecting the reference mark and the first mark and a line segment interconnecting the reference mark and the second mark join each other perpendicularly.

5. The image evaluating apparatus according to claim 3, further comprising a particular mark detector for detecting the position of the positioning mark in the measurement image region.

6. An image evaluating method for acquiring image data produced by electronically reading an evaluation chart on a recording medium and quantifying quality of the evaluation chart based on the image data, the image evaluating method enabling a computer to carry out the steps of:

acquiring standard positional information about a plurality of regions of interest to be quantified which are designated in a standard image region that is an image region having a standard size in the evaluation chart, the standard positional information being acquired by reading a data file depending on the evaluation chart;

calculating an image magnification which represents a size ratio of a measurement image region represented by the image data to the standard image region; and calculating positional information of the plurality of regions of interest depending on the measurement image region based on the acquired standard positional information and the calculated image magnification.

7. A non-transitory storage medium storing a program for acquiring image data produced by electronically reading an evaluation chart on a recording medium and quantifying quality of the evaluation chart based on the image data, the program enabling a computer to function as:

a standard positional information acquirer for acquiring standard positional information about a plurality of regions of interest to be quantified which are designated in a standard image region that is an image region having a standard size in the evaluation chart, the standard positional information being acquired by reading a data file depending on the evaluation chart;

an image magnification calculator for calculating an image magnification which represents a size ratio of a measurement image region represented by the image data to the standard image region; and a positional information calculator for calculating positional information of the plurality of regions of interest depending on the measurement image region based on the standard positional information acquired by the standard positional information acquirer and the image magnification calculated by the image magnification calculator.

* * * * *